May 18, 1965  N. SHOTSKY  3,183,868
APPARATUS FOR PRODUCING STRETCHABLE FABRIC
Filed May 16, 1963  4 Sheets-Sheet 1
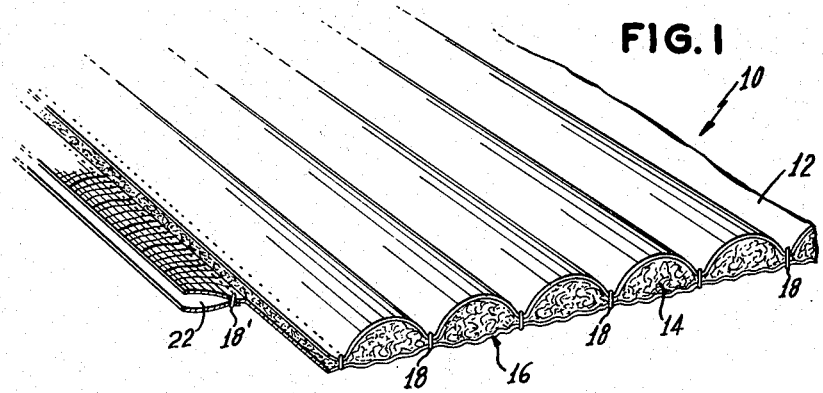
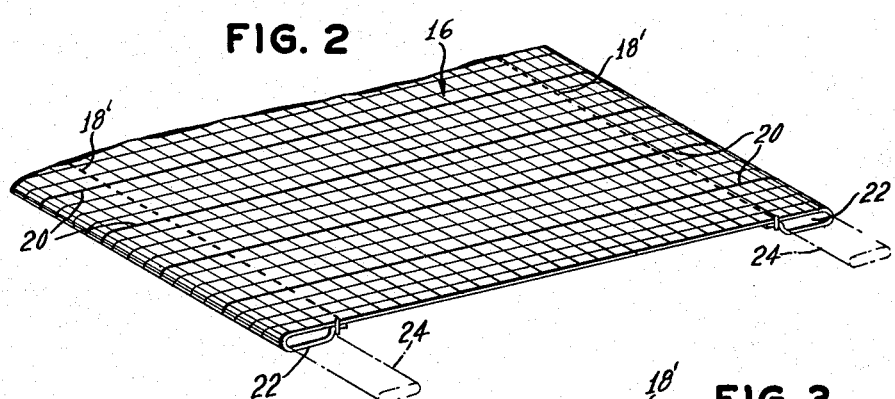
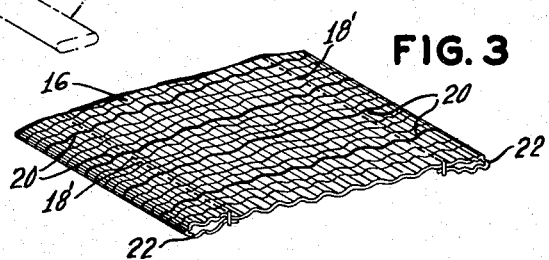
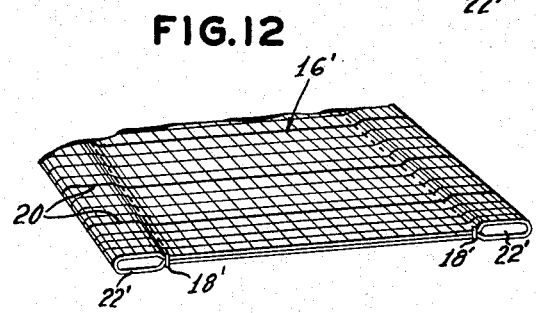
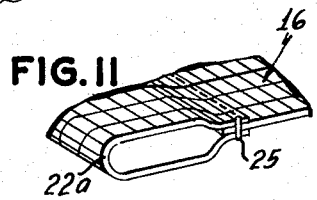
INVENTOR.
NATHAN SHOTSKY
BY Harry Cole
ATTORNEY May 18, 1965  N. SHOTSKY  3,183,868
APPARATUS FOR PRODUCING STRETCHABLE FABRIC
Filed May 16, 1963  4 Sheets-Sheet 3

INVENTOR.
NATHAN SHOTSKY
BY Harry Cole
ATTORNEY

May 18, 1965  N. SHOTSKY  3,183,868
APPARATUS FOR PRODUCING STRETCHABLE FABRIC
Filed May 16, 1963  4 Sheets-Sheet 4
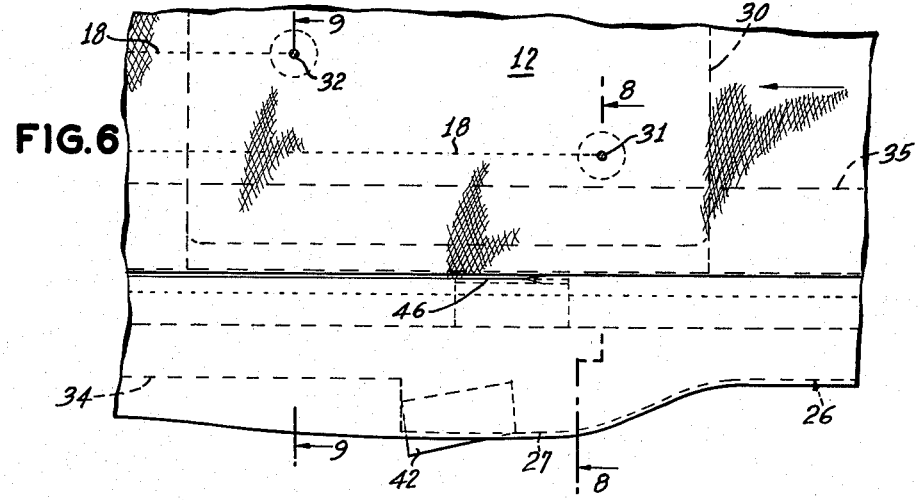
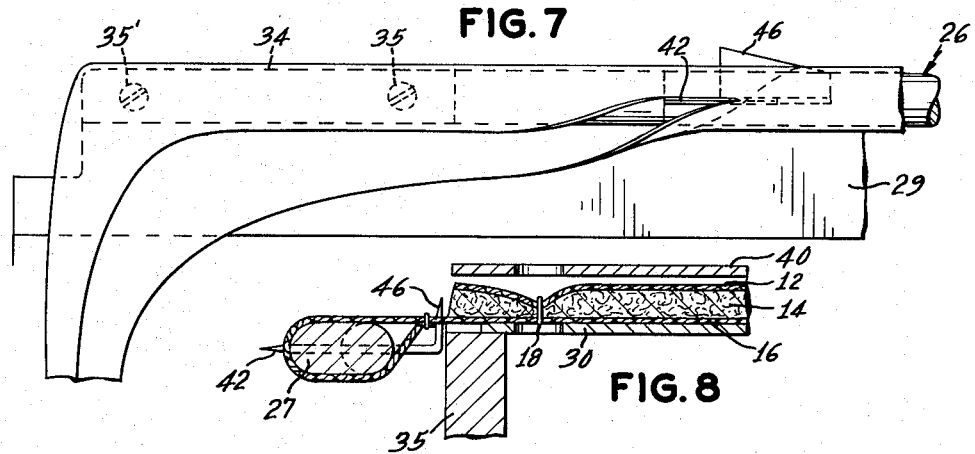
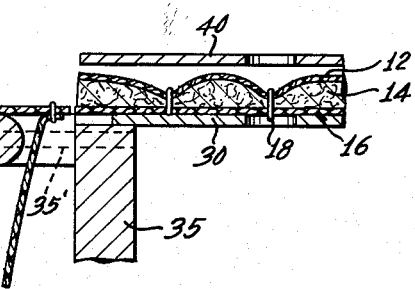
INVENTOR.
NATHAN SHOTSKY
BY Harry Cohn
ATTORNEY

United States Patent Office 3,183,868
Patented May 18, 1965

3,183,868
APPARATUS FOR PRODUCING STRETCHABLE FABRIC
Nathan Shotsky, Woodmere, N.Y., assignor to The Multex Company, Brooklyn, N.Y., a partnership of New York
Filed May 16, 1963, Ser. No. 280,910
9 Claims. (Cl. 112—118)

This invention relates to means for and a method of producing stretchable material, for example but without limitation, stretch fabric for jackets and other articles of wearing apparel.

One object of the invention is to provide a simple way of producing stretchable fabric having one or more layers of initially non-stretchable fabric and a layer of stretchable fabric, the composite multi-layer material being resiliently stretchable and contractable widthwise thereof.

Another object of the invention, in a more specific aspect thereof, is to provide stretch quilted material of the above indicated character, namely a resiliently stretchable and contractable quilted material having an outer layer of initially inextensible fabric, an intermediate layer of quilting material, and an inner or lining layer of resiliently stretchable and contractable material stitched together in such manner that the composite quilted material is resiliently stretchable and contractable widthwise thereof.

Another object of the invention is to provide simple and effective apparatus or means for manufacturing fabric of the above indicated character.

The above and other objects, features and advantages of the invention will be fully understood from the following description considered in connection with the accompanying illustrative drawings.

In the drawings:

FIG. 1 is a perspective view, partly in section, of a piece of fabric made in accordance with the present invention;

FIG. 2 is a perspective view of a piece of stretchable fabric, in a laterally stitched condition, preferably employed in accordance with the present invention, and illustrates schematically part of the method employed in producing the fabric illustrated by FIG. 1;

FIG. 3 is a perspective view of the resiliently stretchable fabric shown in FIG. 2 but showing the fabric in its nonstretched or relaxed condition;

FIG. 6 is a plan view on a larger scale of part of the machine and the material as it passes through the machine;

Figure 10:
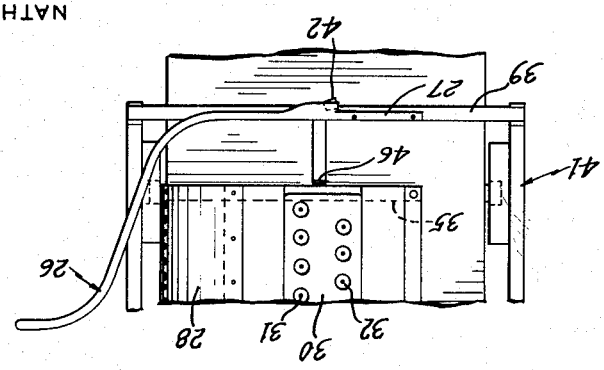

FIGS. 7, 8 and 9 are sectional views taken along the lines 7—7, 8—8, and 9—9, respectively, of FIG. 6;

FIG. 10 is a top plan view of part of the machine showing the stretch bars and cutting members mounted on the laterally movable carriage of a quilting machine; and FIGS. 11 and 12 are fragmentary perspective views of stretchable fabrics which may be used in place of the fabric shown by FIG. 3.

Briefly described, the fabric of the present invention is produced by stitching layers of the stretchable fabric or other sheet material and less or non-stretchable fabric or other sheet material in superimposed relation along a plurality of laterally spaced lines of stitching while the stretchable fabric is in stretched condition widthwise thereof so that when the tension on the stretchable fabric is released, the composite material is in a somewhat gathered condition widthwise thereof so that it can be stretched to the limit of the non-stretchable fabric in the condition it was during the stitching operation while the stretchable material was in stretched condition. In its non-stretched condition, the non-stretchable fabric has a degree of fullness laterally between a plurality of pairs of lines of stitching which enables the composite material to be stretched.

According to the present invention, the stretchable material is held in stretched condition during the stitching operation by means which permits the plurality of layers of fabric to advance from the supply rolls to the needles of the sewing machine which, in the illustrated embodiment of the invention, is of a known type of multiple needle automatic quilting machine such as that shown for example in my United States patent, No. Re. 24,305, issued August 31, 1954. Said patent describes apparatus for shirring fabric, the shirring being accomplished by securing on one face of the fabric a plurality of laterally spaced elastic threads under tension during the securing operation so that upon releasing of the tension, the fabric is shirred longitudinally thereof. In accordance with the preferred embodiment of the present invention, the shirred fabric produced as described in said patent is preferably, but no necessarily, utilized as the resiliently stretchable layer of material referred to above, this being accomplished by disposing the shirred fabric so that the superimposed elastic threads extend widthwise of the fabric, thus enabling the stretchable material to be stretched widthwise of the composite fabric during the stitching of the stretchable material to the inextensible fabric, i.e., to the outer layer or to both the outer layers and the layer of quilting material.

Referring now to the drawings in detail, the stretchable fabric 10 may be formed in any length and of a width up to that permitted by the size of the quilting machine. As here shown, said fabric comprises an outer layer 12 of any suitable cloth which is ordinarily woven, a layer 14 of quilting material, and an inner layer of resiliently stretchable and contractable sheet material 16 which can be stretched laterally of the fabric 10, i.e., transversely of the lines of stitching 18 which secure the three layers to each other in superimposed relation. The stretchable layer 16 is shown by FIGS. 2 and 3 in stretched and in relaxed condition, respectively. Said stretchable material comprises a layer of loosely woven fabric or netting 16 on which superimposed elastic threads 20 are secured by stitching in the use of the multiple needle machine described in my above mentioned patent. The shirred elastic fabric is presently preferred for use as the elastic fabric of layer 16, but it will be understood that it is within the scope of the invention to employ any other suitable elastic material in place of the shirred fabric 16. Fabric 16 is hemmed at its opposite side edges as indicated at 22, forming tunnels to receive stretch bars 26 hereinafter more particularly described with reference to FIGS. 4 to 10, or said fabric can be, as represented by the fabric 16', folded and stitched longitudinally as indicated at 22' in FIG. 12. Preferably, however, the hems provided to receive the stretch bars are formed by stitching bands 22a of narrow fabric along the opposite sides, respectively, of fabric 16 as indicated at 25 in FIG. 11.

Figure 4:
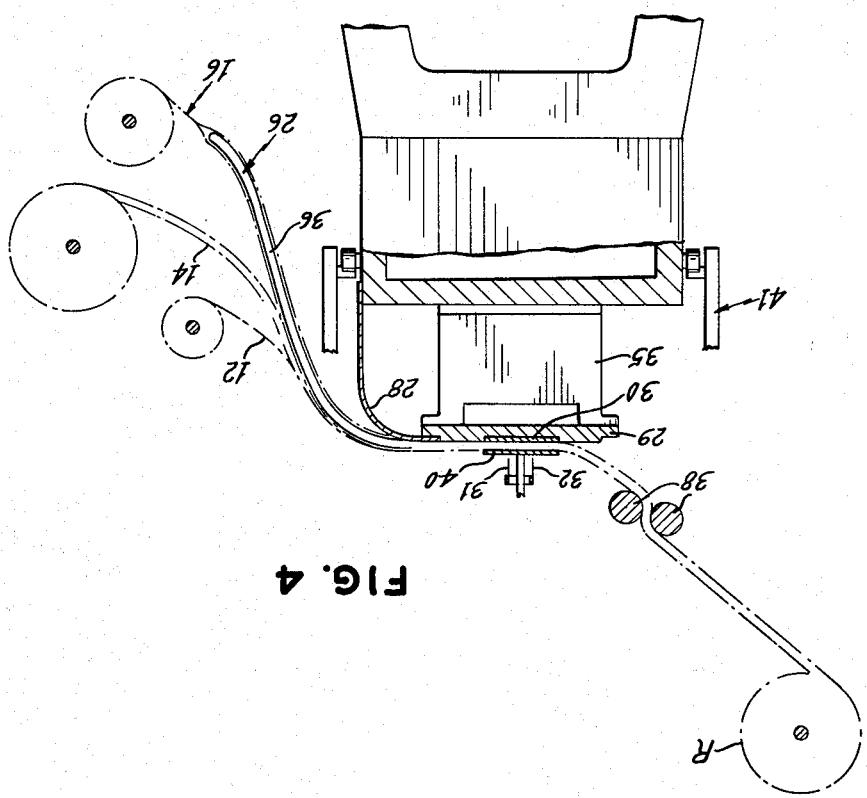
FIG. 4 is a view, partly in section, schematically illustrating the method and apparatus of the present invention.
Figure 5:
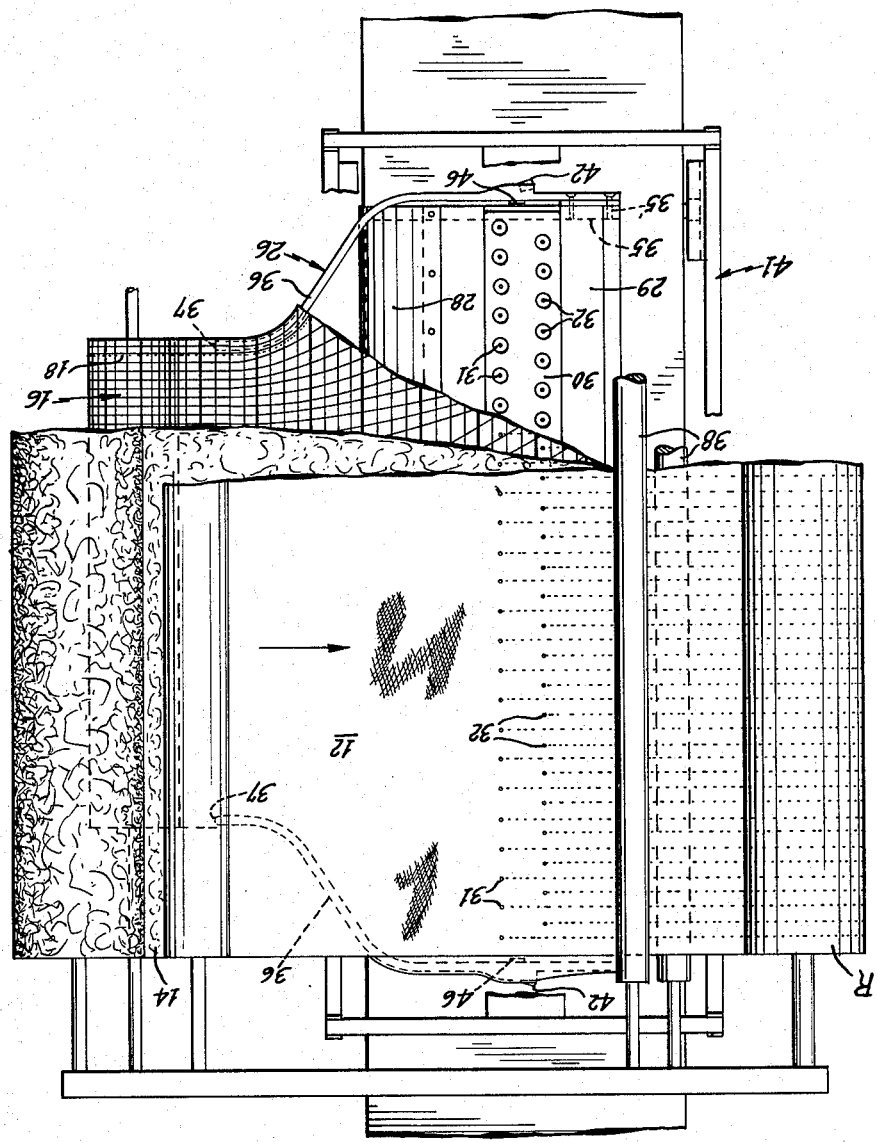
FIG. 5 is a top plan view of the apparatus shown by FIG. 4, certain parts being omitted for the purpose of illustration.

Referring first to FIG. 4, there is shown partly structurally and partly schematically the multiple needle sewing machine employed in producing the fabric of the present invention. The stretchable fabric 16 passes onto the apron 28 along with the superimposed fabric and quilting layers 12 and 14, respectively, and to the needles 31 and 32 of the quilting machine, said needles being arranged laterally of each other in two rows. The rear ends 27 of the stretch bars are secured at the opposite ends 29 of the shuttle race stand 35 of the machine in any suitable way as by the brackets 34 to which they are welded or otherwise secured and which are secured to the race stand 35 by screws 35' or in any other suitable way (FIGS. 7 and 8). As shown by FIGS. 4 and 5, the stretch bars 26 extend forwardly of the apron 28 and have parts 36 which are inclined downwardly and toward each other, terminating in free ends 37. As the stretchable fabric moves toward the needles, the converging parts 36 of the stretch bars 26 enter the tunnels formed by the hems 22 and said stretchable material is, therefore, stretched laterally during its movement longitudinally toward the needles 31 and 32 so that just before the stretchable material reaches the first row of needles 31, the stretchable fabric 16 is stretched to a width greater than the width of each of the fabric layers 12 and 14. It will be understood that said stretchable fabric 16 is fed to and moved past the needles by the driven feed rolls 38 which are driven intermittently at a constant speed, as explained in said patent, for moving the fabric when the pressure plate 40 and the rows of needles are in their raised position. In the embodiment of the invention illustrated by FIGS. 4 to 9, the carriage is not moved laterally and thread is supplied only to the needles 31. Consequently, the lines of stitching 18 extend longitudinally of the fabric along parallel lines as described in said U.S. Patent No. Re. 24,305, but it will be understood that it is within the scope of the present invention to supply threads to needles 32 as well as to needles 31 and to move said carriage laterally as described in said patent for providing various decorative surface patterns of stitching by said needles 31 and 32. This is illustrated by FIG. 10 which shows the stretch bars 26 secured to the end members 39 of laterally movable carriage frame 41 which is reciprocated laterally as described in said U.S. Patent No. Re. 24,305. It will be understood also that a decorative pattern of laid on threads or cords may be stitched on the face of layer 12 as described in said patent.

Shortly after the stitching operation is performed by the first row of needles 31, the hems 22 are cut at the outer side edges of the layer 16 as illustrated by FIG. 6 so that the laminated material is freed from the stretch bars and wound on the takeup roll R (FIG. 4). The cutting of the hems 22 at the opposite side edges of the stretchable fabric 16 is accomplished by the knives 42 which are secured in the upper ends of the stretch bars 26 in position to perform the cutting operation immediately after the composite material is stitched by operation of the first row of needles 31. It will be noted that the knives 42 are stationary and that the cutting edge of each knife is inclined rearwardly so that the cutting operation is performed gradually and effectively during the movement of the stretchable material over the upper parts 24 of the stretch bars 26. If desired, the hemmed portion of the stretchable layer 16 at each side edge thereof may be removed after the stitching operation. For this purpose, knives, each having a vertical blade 46, are mounted on rest plate 30 laterally inwardly of the upper parts 24 of the stretch bars 26 in position to sever the stretchable material. FIG. 1 shows the hem 22 partly removed and the remaining hem cut open at the side so that the material is free to leave the stretch bars 26 and be moved to the take-up roll. As illustrated by FIGS. 5 to 7, the knives 46 are positioned to cut off the hems 22 shortly before the hems are cut open by the knives 42. It will be understood that driven rotary knives may be used in place of the stationary knives 42 and 46.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A sewing machine comprising: a plurality of sewing needles arranged in laterally spaced relation; means for feeding a plurality of superposed layers of sheet material to and past said needles for stitching the layers of sheet material together along a plurality of lines extending longitudinally of the layers; one of the layers being laterally resiliently stretchable and having two laterally spaced apart margins; two laterally fixed and laterally spaced apart guide means for interlocking with the margins respectively, each having a leading end portion extending forward of said needles and laterally spaced mutually apart a distance equal to the lateral distance between the two margins in the unstretched, stretchable layer, whereby said leading end portions may respectively engage the margins; said two guide means each having a mediate portion extending longitudinally adjacent said needles and laterally mutually spaced apart a distance greater than the lateral distance between the two margins in the unstretched, stretchable layer, whereby the stretchable layer is laterally stretched between said mediate portions of said two guide elements as the stretchable layer is longitudinally advanced along said guide elements to said needles and is stitched thereby.

2. A sewing machine comprising: a plurality of sewing needles arranged in laterally spaced relation; means for feeding a plurality of superposed layers of sheet material to and past said needles for stitching the layers of sheet material together along a plurality of lines extending longitudinally of the layers; one of the layers being laterally resiliently stretchable and having two laterally spaced apart margins; two laterally fixed and laterally spaced apart guide means for interlocking with the margins respectively, each having a leading end portion extending forward of said needles and laterally spaced mutually apart a distance equal to the lateral distance between the two margins in the unstretched, stretchable layer, whereby said leading end portions may respectively engage the margins; said two guide means each having a mediate portion extending longitudinally adjacent said needles and laterally mutually spaced apart a distance greater than the lateral distance between the two margins in the unstretched, stretchable layer, whereby the stretchable layer is laterally stretched between said mediate portions of said two guide elements as the stretchable layer is longitudinally advanced along said guide elements to said needles and is stitched thereby; and two severing means, each disposed respectively adjacent said guide means longitudinally rearward of said needles, for severing, respectively, the margins from the stitched stretchable layer.

3. A sewing machine comprising: a plurality of sewing needles arranged in laterally spaced relation; means for feeding a plurality of superposed layers of sheet material to and past said needles for stitching the layers of sheet material together along a plurality of lines extending longitudinally of the layers; one of the layers being laterally resiliently stretchable and having a hem formed in each of the two lateral margins thereof to provide two laterally spaced apart tunnels in this layer; two laterally spaced apart guide elements, each having a leading free end extending longitudinally forward of said needles and laterally spaced mutually apart a distance equal to the lateral distance between the two tunnels in the unstretched, stretchable layer, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable layer, whereby the stretchable layer is laterally stretched between said mediate portions of said two guide elements as the stretchable layer is longitudinally advanced along said guide elements to said needles and is stitched thereby.

4. A sewing machine comprising: a plurality of sewing needles arranged in laterally spaced relation; means for feeding a plurality of superposed layers of sheet material to and past said needles for stitching the layers of sheet material together along a plurality of lines extending longitudinally of the layers; one of the layers being laterally resiliently stretchable and having a hem formed in each of the two lateral margins thereof to provide two laterally spaced apart tunnels in the layers; two laterally spaced apart guide elements, each having a leading free end extending longitudinally forward of said needles and laterally spaced mutually apart a distance equal to the lateral distance between the two tunnels in the unstretched, stretchable layer, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable layer, whereby the stretchable layer is laterally stretched between said mediate portions of said two guide elements as the stretchable layer is longitudinally advanced along said guide elements to said needles and is stitched thereby; and two severing means, each disposed respectively adjacent said guide elements longitudinally rearward of said needles, for severing, respectively, the hems of the stretched, stitched, stretchable layer, thereby releasing the hems from said guide elements.

5. A sewing machine comprising: a plurality of sewing needles arranged in laterally spaced relation; means for feeding a plurality of superposed layers of sheet material to and past said needles for stitching the layers of sheet material together along a plurality of lines extending longitudinally of the layers; one of the layers being laterally resiliently stretchable and having a hem formed in each of the two lateral margins thereof to provide two laterally spaced apart tunnels in the layer; two laterally spaced apart guide elements, each having a leading free end extending longitudinally forward of said needles and laterally spaced mutually apart a distance equal to the lateral distance between the two tunnels in the unstretched, stretchable layer, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable layer, whereby the stretchable layer is laterally stretched between said mediate portions of said two guide elements as the stretchable layer is longitudinally advanced along said guide elements to said needles and is stitched thereby; two first severing means, each disposed respectively adjacent said guide elements longitudinally rearward of said needles, for severing, respectively, the hems of the stretchable layer, thereby releasing the hems from said guide elements; and two second severing means, each disposed longitudinally rearward of said needles, for severing, respectively, the hems of the stretchable layer from the stretchable layer.

6. A sewing machine comprising: a plurality of sewing needles arranged in laterally spaced relation; means for feeding a plurality of superposed layers of sheet material to and past said needles for stitching the layers of sheet material together along a plurality of lines extending longitudinally of the layers; one of the layers being laterally resiliently stretchable and having a hem formed in each of the two lateral margins thereof to provide two laterally spaced apart tunnels in this layer; two laterally spaced apart guide elements, each having a leading free end extending longitudinally forward of said needles and laterally spaced mutually apart a distance equal to the lateral distance between the two tunnels in the unstretched, stretchable layer, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable layer, whereby the stretchable layer is laterally stretched between said mediate portions of said two guide elements as the stretchable layer is longitudinally advanced along said guide elements to said needles and is stitched thereby; two first severing means, each disposed respectively adjacent said guide elements longitudinally rearward of said needles, for severing, respectively, the hems of the stitched, stretched, stretchable layer, thereby releasing the hems from said guide elements; and two second severing means, each disposed longitudinally rearward of said first severing means for severing, respectively, the hems of the released, stretchable layer from the stretchable layer.

7. A ply joining machine comprising: a plurality of ply joining devices arranged in laterally spaced relation; means for feeding a plurality of superposed plies of sheet material to and past said joining devices for joining the plies together along a plurality of lines extending longitudinally of the plies; one of the layers being laterally resiliently stretchable and having a hem formed in each of the two lateral margins thereof to provide two laterally spaced apart tunnels in this ply; two laterally fixed and laterally spaced apart guide elements, each having a leading free end extending longitudinally forward of said joining devices and laterally spaced mutually apart a distance equal to the lateral distance between the two tunnels in the unstretched, stretchable ply, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable ply, whereby the stretchable ply is laterally stretched between said mediate portions of said two guide elements as the stretchable ply is longitudinally advanced along said guide elements to said joining devices.

8. A ply joining machine comprising: a plurality of ply joining devices arranged in laterally spaced relation; means for feeding a plurality of superposed plies of sheet material to and past said joining devices for joining the plies together along a plurality of lines extending longitudinally of the plies; one of the layers being laterally resiliently stretchable and having a hem formed in each of the two lateral margins thereof to provide to laterally spaced apart tunnels in this ply; two laterally fixed and laterally spaced apart guide elements, each having a leading free end extending longitudinally forward of said joining devices and laterally spaced mutually apart a distance equal to the lateral distance between the two tunnels in the unstretched, stretchable ply, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable ply, whereby the stretchable ply is laterally stretched between said mediate portions of said two guide elements as the stretchable ply is longitudinally advanced along said guide elements to said joining devices; and two severing means each disposed respectively adjacent said guide means longitudinally rearward of said joining devices for severing, respectively, the hems of the stretched, stretchable ply, thereby releasing the hems from said guide elements.

9. A ply joining machine comprising: a plurality of ply joining devices arranged in laterally spaced relation; means for feeding a plurality of superposed plies of sheet material to and past said joining devices for joining the plies together along a plurality of lines extending longitudinally of the plies; one of the layers being laterally resiliently stretchable and having a hem formed in each of the two lateral margins thereof to provide two laterally spaced apart tunnels in this ply; two laterally fixed and laterally spaced apart guide elements, each having a leading free end extending longitudinally forward of said joining devices and laterally spaced mutually apart a distance equal to the lateral distance between the two tunnels in the unstretched, stretchable ply, whereby said leading ends may be respectively inserted into the tunnels; said two guide elements each having a mediate portion extending longitudinally adjacent said needles and laterally mutually spaced apart a distance greater than the lateral distance between the two tunnels in the unstretched, stretchable ply, whereby the stretchable ply is laterally stretched between said mediate portions of said two guide elements as the stretchable ply is longitudinally advanced along said guide elements to said joining devices; two severing means, each disposed respectively adjacent said guide means longitudinally rearward of said joining devices for severing, respectively, the hems of the stretched, stretchable ply, thereby releasing the hems from said guide elements and two additional severing means, each disposed longitudinally rearward of said first severing means, for severing, respectively, the hems of the released, stretchable ply from the stretchable ply.

References Cited by the Examiner

UNITED STATES PATENTS

| | | | |
|---|---|---|---|
| 857,968 | 6/07 | Wertheim | 112—414 |
| 1,606,899 | 11/26 | Rockwood | 2—278 |
| 1,606,900 | 11/26 | Rockwood | 2—293 |
| 1,921,691 | 8/33 | Mitchell | 112—2 X |
| 2,045,363 | 6/36 | Mitchell | 112—2 |
| 2,398,063 | 4/46 | Weidenfeld | 26—54 |
| 2,434,111 | 1/48 | Hawley et al. | 26—57 X |
| 2,610,596 | 9/52 | Zygmunt | 112—2 |
| 2,638,067 | 5/53 | Cozart | 112—2 |
| 2,761,401 | 9/56 | Dolney | 112—25 X |
| 3,104,633 | 9/63 | Newman | 112—2 |

FOREIGN PATENTS

| | | |
|---|---|---|
| 1,258,476 | 3/61 | France. |
| 566,402 | 12/44 | Great Britain. |

JORDAN FRANKLIN, *Primary Examiner.*

DAVID J. WILLIAMOWSKY, *Examiner.*